United States Patent [19]

Grieger et al.

[11] 3,896,855

[45] July 29, 1975

[54] MULTIPORTED VALVE

[75] Inventors: Cecil C. Grieger, Houston; Roy W. Benefield, Magnolia; Alton D. Oliver; Clyde H. Chronister, both of Houston, all of Tex.

[73] Assignee: Chronister Development, Inc., Houston, Tex.

[22] Filed: Mar. 12, 1974

[21] Appl. No.: 450,302

[52] U.S. Cl. .................. 137/625.11; 137/625.46
[51] Int. Cl.² .................................. F16K 11/02
[58] Field of Search... 137/610, 612, 625.11, 625.41, 137/625.46, 627, 625.47

[56] References Cited
UNITED STATES PATENTS

| | | | |
|---|---|---|---|
| 2,996,083 | 8/1961 | Huska | 137/625.11 |
| 3,580,540 | 5/1971 | Heinen | 137/625.47 X |
| 3,665,952 | 5/1972 | Chronister | 137/625.11 X |

*Primary Examiner*—Alan Cohan
*Assistant Examiner*—Gerald A. Michalsky

[57] ABSTRACT

A multiported valve having a pipe bend the free end of which is rotated into and out of communication with a plurality of conduit ports. A collar telescopically and sealingly engaging each of the conduits, and movable for telescopically engaging and sealing with the free end of the pipe bend when the free end of the bend is aligned with one of the conduit ports. A single actuator actuated exteriorly of the housing and connected interiorly of the housing to the collars for simultaneously and axially moving the collars. The collars are simultaneously retracted, allowing the pipe bend to be rotated between the conduit ports, and the collars are simultaneously extended to bring one of the collars into engagement with the free end of the pipe bend when the free end of the bend is aligned with one of the conduit ports. First and second levers are pivotally connected to the housing with one end of the levers connected to one of the collars, and the second end of the levers being connected to the actuator for axially moving the collars.

4 Claims, 3 Drawing Figures

3,896,855

MULTIPORTED VALVE

BACKGROUND OF THE INVENTION

The provision of a multiported valve having a rotatable elbow or pipe bend therein is disclosed in U.S. Pat. No. 3,665,952. The present invention is directed to various improvements in such a valve to provide an improved sealing arrangement between the rotatable pipe bend and the conduit ports. Sealing collars are provided which may be axially moved into engagement with and retracted from the pipe bend by actuation exteriorly of the valve housing. The collars are connected to a mechanism for simultaneously retracting and extending the collars from a single actuator.

SUMMARY

The present invention is directed to a multiported elbow or pipe bend valve in which the pipe bend is rotated about one end to bring the second end of the pipe bend into and out of alignment with a plurality of conduit ports.

A further object of the present invention is the provision of a movable collar positioned in the housing and telescopically and sealably engaging each of the conduit ports and adapted to be moved to engage and seal with the second end of the pipe bend when the second end is aligned with one of the conduit ports.

A still further object of the present invention is the provision of means connected to a plurality of the collars for simultaneously retracting the collars thereby allowing the second end of the pipe bend to be rotated between the conduits ports, and extending the collars to bring one of the collars into engagement with the second end of the pipe bend when the second end is aligned with one of the conduit ports.

A still further object of the present invention is the provision of a single actuator actuated from outside the housing and connected interiorly of the housing to the collars for axially moving, and retracting and extending the collars.

Still a further object of the present invention is the provision of a mechanism including first and second levers in the housing pivotally connected to the housing with the first ends of each of the levers connected to one of the collars and the second ends of the levers connected to an actuator.

Other and further features and advantages will be apparent from the following description of the preferred embodiment of the invention.

DESCRIPTION OF THE PREFERRED EMBODIMENT

Figure 1:
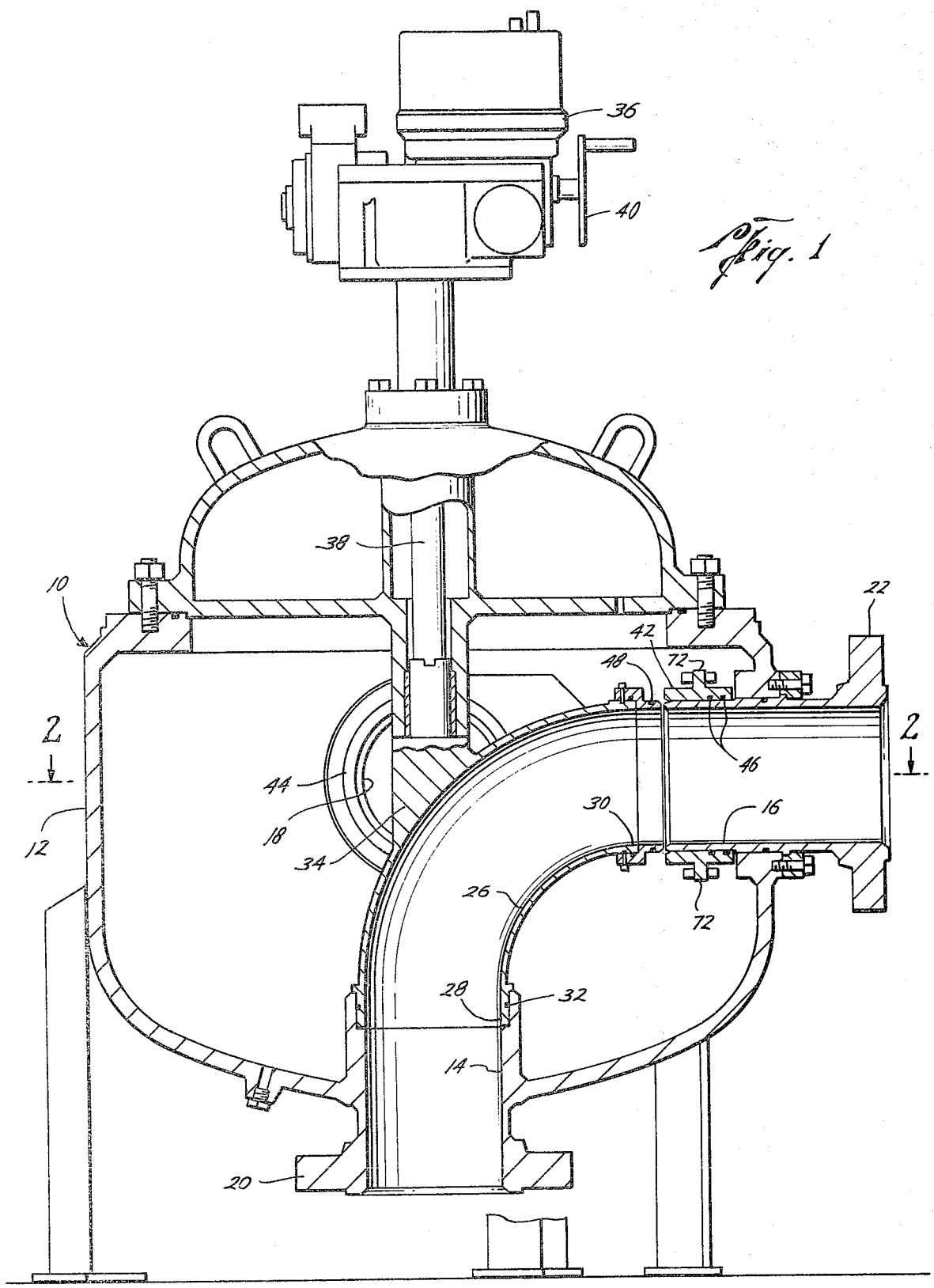
FIG. 1 is an elevational view, in cross section, of the valve of the present invention.
Figure 2:
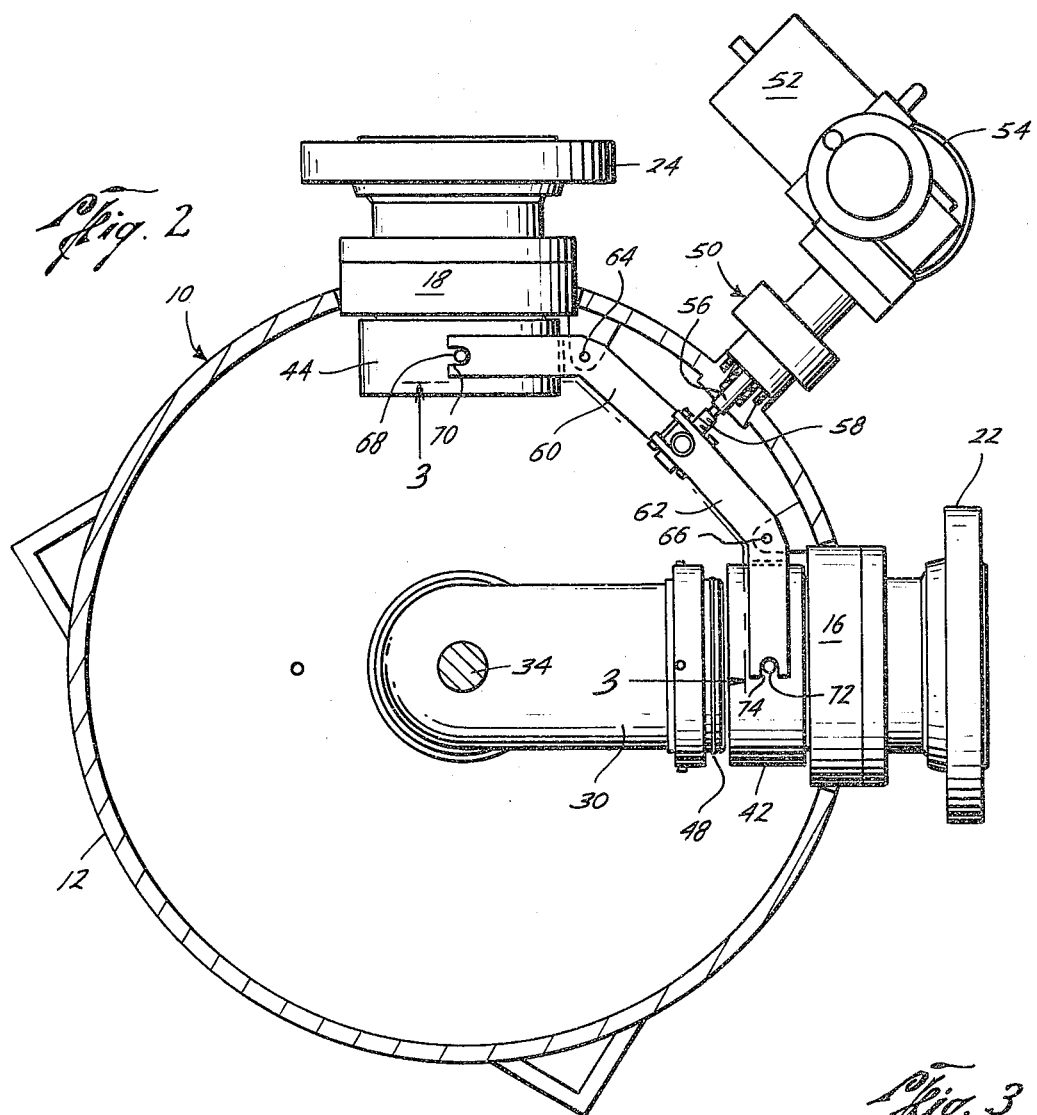
FIG. 2 is a cross-sectional view taken along the line 2—2 of FIG. 1.

Referring now to the drawings, and particularly to FIGS. 1 and 2, the reference numeral 10 generally indicates the multiported valve of the present invention. The valve 10 generally includes a housing 12 having a plurality of conduits extending therein, such as conduits 14, 16 and 18, forming ports through the valve housing 12, although any suitable number may be provided as desired. The conduits 14, 16 and 18 may include suitable flange members 20, 22 and 24, respectively, for conveniently connecting the ports to suitable lines.

A pipe elbow or pipe bend 26 is provided in the housing 12 having a first end 28 and a second end 30. The pipe bend is rotatable about the first end 28 which is pivotally connected to one of the conduits, such as conduit 14, in a sealing relationship such as by a seal 32. Rotation of the pipe end 26 may bring the second end 30 into alignment with one of the conduits 16 and 18 for placing either of the conduits 16 or 18 in fluid communication with the conduit 14. Normally, the conduit port 14 would be the fluid inlet and conduits 16 and 18 would be outlets; however, in some applications, the conduit 14 could be the outlet and the conduits 16 and 18 would be inlets.

Suitable means are provided for rotating the pipe bend 26 such as a trunnion 34 connected to a conventional actuator 36 having a rotatable stem 38 connected to the trunnion 34. The actuator 36 may be controlled by hand wheel 40 for rotating the pipe bend 26 about its first end 28 to bring the second end 30 into and out of alignment with either of the conduits 16 and 18.

Movable collars 42 and 44 are positioned in the housing 12 and each telescopically engage one of the conduits 16 and 18, respectively. The collars 42 and 44 sealingly engage the conduits 16 and 18, respectively, such as by seals 46 (FIG. 1). In addition, the collars 42 and 44 sealingly engage the second end 30 of the pipe bend 26, such as by seals 48, when the collars 42 and 44 are extended into telescopic engagement therewith.

The collars 42 and 44 are retracted and disengaged from the end 30 of the pipe bend 26 for allowing the bend 26 to be rotated between the conduits 16 and 18. When the second end 30 of the pipe bend 26 is rotated into alignment with one of the conduits 16 and 18, the collars are extended so that one of the collars telescopically engages and seals with the end 30 of the pipe bend 26. The end 30 is aligned with one of the conduits 16 and 18 and engage with one of the collars to provide and limit fluid communication between the conduit 14 and the conduit with which the end 30 is aligned.

Figure 3:
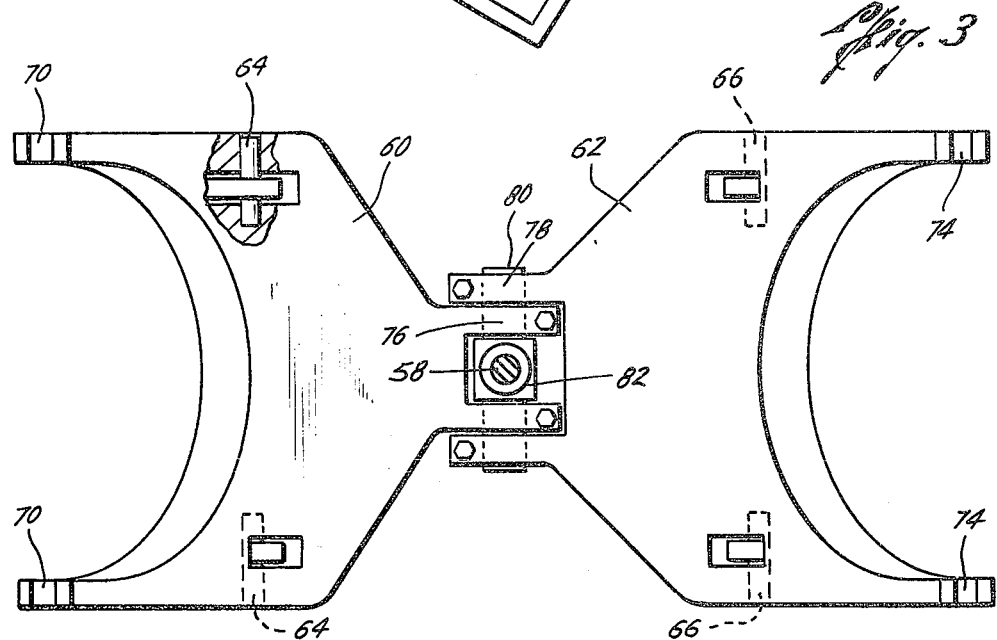
FIG. 3 is an enlarged cross-sectional view taken along the line 3—3 of FIG. 2.

Referring now to FIGS. 2 and 3, suitable means are provided connected to both of said collars 42 and 44 for simultaneously retracting the collars 42 and 44 for allowing the second end 30 of the bend 26 to be rotated and moved between the second and third conduits 16 and 18. In addition, the collar actuating means generally indicated by reference numeral 50 simultaneously extends the collars 42 and 44 to bring one of the collars 42 and 44 into engagement with the second end 30 of the pipe bend 26 when the second end 30 is aligned with one of the conduits 16 and 18. The collar actuating mechanism 50 may include a first lever 60, a second lever 62 and an actuator 52 which is suitably controlled, such as by hand wheel 54, for rotating a stem 56 having a screw 58 connected thereto. The levers 60 and 62 are positioned in the housing 12 and pivotally mounted thereto by pivot pins 64 and 66, respectively. One end of the lever 60 is connected to the collar 44 such as by one or more pins 68 connected to the collar 44 and one or more slots 70 on the lever 60. Similarly, the second lever 62 is connected to the collar 42 by one or more pins 72 on the collar 42 and one or more slots 74 on the lever 62. Inward and outward movement of the second ends of the levers 60 and 62 will simultaneously retract and extend the collars 42 and 44. A yoke 76 is connected to the second end of the lever 60 and a yoke 78 is connected to the second end of the lever 62. The yokes 76 and 78 rotatably engage a pin 80 which in turn is connected to a nut 82 threadably engaging the screw 58. Therefore, actuation of the actuator 52 controls the inward and outward movement of the yokes 76 and 78 to simultaneously pivot the levers 60 and 62 about the pins 64 and 66 respectively, for simultaneously retracting and extending the collars 42 and 44.

In use, the actuator 52 is operated to axially move the collars 42 and 44 into a retracted position telescopically on the conduits 16 and 18 in which the collars are disengaged from the second end of the pipe bend 26. Thereafter, the actuator 36 may be operated to rotate the pipe bend 26 so so as to bring the second end 30 thereof into alignment with one of the conduits 16 and 18. Thereafter, the actuator 52 is again operated to extend the collars 42 and 44 and bring one of the collars into a sealing engagement with the second end 30 of the pipe bend 26. The collar actuating mechanism 50 allows both of the sealing collars 42 and 44 to be moved together and avoids the necessity or requiring separate actuators to individually move each of the collars 42 and 44, and also insures that both collars 42 and 44, by operation of the single actuator 52, are in the proper position to allow rotation of the pipe bend 26.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A multiported valve comprising, a housing having first, second and third conduits extending therein, a pipe bend in said housing having first and second ends, the first end thereof being pivotally sealable to the first conduit, means connected to the bend and extending outside of said housing for rotating said bend about the first end for moving the second end into and out of alignment with the second and third conduits, a movable collar positioned in said housing and telescopically and sealably engaging each of the second and third conduits for telescopically engaging and sealing with the second end of the pipe bend when the second end is aligned with one of the second and third conduits, and means connected to both of said collars and actuated exteriorly of the housing for simultaneously retracting said collars allowing the second end of the bend to be moved between the second and third conduits, and extending the collars to bring the collars into engagement with the second end of the bend when the second end is aligned with one of the second and third conduits, said means connected to said collars including, first and second levers in the housing, one end of each of the levers connected to one of the collars, said levers pivotally connected to the housing, a single actuator actuated exteriorly of the housing and connected to the second ends of the first and second levers for axially moving both of the collars.

2. The apparatus of claim 1 wherein, each collar includes a pin, and the first ends of each lever include a slot coacting with one of said pins.

3. The apparatus of claim 1 wherein each collar includes engaging means positioned at diametrically opposed points on each collar, and the first ends of each lever include means coacting with each of the engaging means.

4. The apparatus of claim 1 wherein the single actuator is pivotally connected to the second ends of the first and second levers.

* * * * *